Patented May 13, 1930

1,758,340

UNITED STATES PATENT OFFICE

HERMANN WAGNER, OF SODEN-ON-THE-TAUNUS, AND ADOLF KUCHENBECKER AND RICHARD HUSS, OF FRANKFORT-ON-THE-MAIN-HOCHST, GERMANY, ASSIGNORS TO GENERAL ANILINE WORKS, INC., OF NEW YORK, N. Y., A CORPORATION OF DELAWARE

AZO DYESTUFFS AND MATERIAL DYED THEREWITH

No Drawing. Application filed December 3, 1928, Serial No. 323,557, and in Germany December 13, 1927.

The present invention relates to new azo dyestuffs and material dyed therewith.

We have found that dyestuffs of violet tints are obtained by coupling a diazo compound of the till present unknown di-ethers of 1-amino-2.4-dioxy-5-aroylaminobenzene of the following formula:

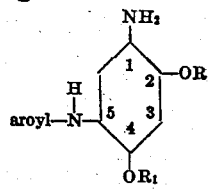

wherein R and $R_1$ stand for alkyl, aryl or aralkyl and wherein the aroyl residue may be substituted or not, but may not contain any free sulfonic acid or carboxylic acid group, with a 2.3-hydroxynaphthoic acid arylamide.

The dyestuffs are distinguished by an excellent fastness to washing and chlorine and partially by very good fastness to kier-boiling. They are suitable for the production of dyeings on animal and vegetable fiber and on viscose silk. The tints vary between red violet and blue violet.

The dyestuffs may be prepared on the fiber and in substance.

The following examples serve to illustrate our invention but they are not intended to limit it thereto.

In the Examples 1–3 and 8–11 regarding dyeing cotton yarn there are impregnated 50 grams of bleached cotton yarn with the grounding liquor (a) for ½ hour, well freed from water by wringing out or hydro-extracting and dyed in the dyebath (b) for ½ hour. The dyed material is rinsed, soaped at the boil, again rinsed and dried.

1. (a) Grounding liquor 0.4 gram of 2.3-hydroxynaphthoic acid-5-chloro-2-toluidide
0.8 cc. of Turkey red oil of 50 per cent strength
1 cc. of caustic soda lye of 34° Bé. are dissolved together and made up with water to
1 liter

(b) Dye-bath 1 gram of 1-amino-2.4-dimethoxy-5-benzoylaminobenzene is diazotized with
1 cc. of hydrochloric acid of 22° Bé. and
3 cc. of sodium nitrite 1:10, while cooling with ice. When diazotizing is complete the liquid is neutralized with about 4 cc. of sodium acetate solution 1:5 and 2 cc. of sodium bicarbonate solution 1:10, whereupon
10 grams of common salt are added and the whole is made up with water to
1 liter The dyeing is a vivid violet fast to boiling lye.

2. (a) Grounding liquor 1.1 gram of 2.3-hydroxynaphthoic acid-ortho-toluidide
2.2 cc. of Turkey red oil of 50 per cent strength
1.7 cc. of caustic soda lye of 34° Bé. are dissolved together and made up with water to
1 liter

(b) Dye-bath 1 gram of 1-amino-2.4-dimethoxy-5-benzoylaminobenzene is diazotized with
1 cc. of hydrochloric acid of 22° Bé. and
3 cc. of sodium nitrite 1:10, while cooling with ice. When diazotization is complete the liquid is neutralized with about 4 cc. of sodium acetate solution 1:5 and 2 cc. of sodium bicarbonate solution 1:10, whereupon
10 grams of common salt are added and the whole is made up with water to
1 liter There is obtained a vivid violet fast to boiling lye.

3. (a) Grounding liquor 0.63 gram of 2.3-hydroxynaphthoic acid-2'.5'-dimethoxy-1'-anilide
1.26 cc. of Turkey red oil of 50 per cent strength, and
1.26 cc. of caustic soda lye of 34° Bé., are dissolved together and made up with water to
1 liter

(b) Dye-bath 1 gram of 1-amino-2.4-dimethoxy-5-benzoylaminobenzene is diazotized with
1 cc. of hydrochloric acid of 22° Bé. and
3 cc. of sodium nitrite 1:10, while cooling with ice. When diazotization is complete, the liquid is neutralized with about 4 cc. of sodium acetate solution 1:5 and 2 cc. of sodium bicarbonate solution 1:10, whereupon
10 grams of common salt are added and the whole is made up with water to
1 liter There is obtained a dull violet of good properties of fastness.

4. (a) *Grounding liquor*

0.45 gram of 2.3-hydroxynaphthoic acid-meta-nitranilide
0.9 cc. of Turkey red oil of 50 per cent strength and
1.35 cc. of caustic soda lye of 34° Bé. are dissolved together and made up with water to
100 cc.

The solution is cooled and mixed with 0.45 cc. of formaldehyde of 30 per cent strength. To this solution there is added a small quantity of a protective colloid and the whole is made up to 1 liter. 33 grams of degummed chappe silk are treated for 20 minutes in this grounding-bath and then there are added to the liquor 10 grams of common salt and the treatment is continued for another 20 minutes. The yarn is then drained by centrifuging and dyed for 20 minutes in the following bath.

(b) *Dye-bath*

1 gram of 1-amino-2.4-dimethoxy-5-benzoylaminobenzene is diazotized and then neutralized in the manner described in Example 1b. To the solution thus obtained is added
1 cc. of acetic acid of 50 per cent strength and the whole is made up with water to
1 liter The yarn is well rinsed, then passed through a warm bath containing 3 cc. of hydrochloric acid of 22° Bé. per litre. After further rinsing, the yarn is then passed through a warm sodium carbonate bath containing 3 grams of sodium carbonate and a small quantity of protective colloid. It is then soaped twice at about 90° C. with 5 grams of Marseilles soap per liter, rinsed and brightened with formic acid. There is thus obtained a vivid violet.

5. In Example 4a there is substituted the same proportion of 2.3-hydroxynaphthoic acid-5-chloro-2-toluidide for the 2.3-hydroxynaphthoic acid-meta-nitranilide. The dyeing obtained is a vivid violet fast to boiling.

6. In this case the procedure is as in Example 4a with use of 2.3-hydroxynaphthoic acid-ortho-toluidide instead of 2.3-hydroxynaphthoic acid-meta-nitranilide, the proportions being the same. The dyeing obtained is a vivid violet fast to boiling.

7. 272 parts of 1-amino-2.4-dimethoxy-5-benzoylaminobenzene are diazotized by means of 69 parts of sodium nitrite in hydrochloric acid in the usual manner, and the diazo-solution is coupled with an alkaline solution of 2.3-hydroxynaphthoic acid-5-chloro-2-toluidide (NH:Cl:CH$_3$=1:4:6). The violet precipitate thus obtained is filtered, washed and dried.

8. (a) *Grounding liquor*

0.4 gram of 2.3-hydroxynaphthoic acid-5-chloro-2-toluidide
0.8 cc. of Turkey red oil of 50 per cent strength and
1 cc. of caustic soda lye of 34° Bé. are dissolved together and made up with water to
1 liter (b) *Dye-bath*

1 gram of 1-amino-2.4-dimethoxy-5-benzoylaminobenzene is diazotized by means of
1 cc. of hydrochloric acid of 22° Bé. and
3 cc. of sodium nitrite (1:10) while cooling with ice. When diazotization is finished there are added
20 cc. of sodium bicarbonate solution (1:10) and
10 grams of common salt, and the whole is made up with water to
1 liter The dyeing obtained is a vivid violet, fast to boiling lye.

9. (a) *Grounding liquor*

1.1 grams of 2.3-hydroxynaphthoic acid-ortho-toluidide
2.2 cc. of Turkey red oil of 50 per cent strength and
1.7 cc. of caustic soda lye of 34° Bé. are dissolved together and made up with water to
1 liter (b) *Dye-bath*

1 gram of 1-amino-2.4-dimethoxy-5-benzoylaminobenzene is diazotized with
1 cc. of hydrochloric acid of 22° Bé. and
3 cc. of sodium nitrite (1:10) while cooling with ice. When diazotization is complete the liquid is neutralized with 20 cc. of sodium bicarbonate solution (1:10), whereupon
10 grams of common salt are added and the whole is made up with water to
1 liter The dyeing obtained is a vivid violet fast to boiling lye.

10. (a) *Grounding liquor*

1.63 grams of 2.3-hydroxynaphthoic acid-2'.5'-dimethoxy-1-anilide
1.26 cc. of Turkey red oil of 50 per cent strength
1.26 cc. of caustic soda lye of 34° Bé. are dissolved together and made up with water to
1 liter (b) *Dye-bath*

1 gram of 1-amino-2.4-dimethoxy-5-benzoylaminobenzene is diazotized by means of
1 cc. of hydrochloric acid of 22° Bé. and
3 cc. of sodium nitrite (1:10) while cooling with ice. When diazotization is finished there are added 20 cc. of sodium bicarbonate solution (1:10), whereupon
10 grams of common salt are added and the whole is made up with water to
1 liter The dyeing obtained is a dull violet of good properties of fastness.

11. (a) *Grounding liquor*

3.6 grams of 2.3-hydroxynaphthoic acid-5-chloro-2-toluidide
7.2 cc. of Turkey red oil of 50 per cent strength and
7.2 cc. of caustic soda lye of 34° Bé. are dissolved together mixed with 3.6 cc. of formaldehyde of 30 per cent strength and made up with water to
1 liter (b) *Dye-bath*

2.85 grams of 1-amino-2.4-diethoxy-5-benzoylaminobenzene are diazotized with
5.2 cc. of hydrochloric acid of 22° Bé. and
15 cc. of sodium nitrite (1:10) while cooling with ice. When diazotization is complete, the liquid is neutralized with about
60 cc. of sodium bicarbonate (1:10) and
25 grams of common salt are added and the whole is made up with water to
1 liter There is obtained a very deep vivid violet fast to boiling lye.

The coupling on vegetable fiber is particularly rapid and complete if as in the Examples 8–11 the operation is conducted in alkaline or bicarbonate solution. The dyeings obtained are more powerful than when the coupling is in acetic acid.

A series of further valuable dyestuffs obtainable on the fiber according to the invention are as follows:

2'.3'-hydroxynaphthoic acid-2-anisidide
2'.3'-hydroxynaphthoic acid-4-anisidide
2'.3'-hydroxynaphthoic acid-1-naphthylamide
2'.3'-hydroxynaphthoic acid-2-naphthylamide
2'.3'-hydroxynaphthoic acid-anilide
2'.3'-hydroxynaphthoic acid-3-nitranilide
2'.3'-hydroxynaphthoic acid-dianisidide
2'.3'-hydroxynaphthoic acid condensed with 2-aminodiphenyl ether
2'.3'-hydroxynaphthoic acid-4-chloro-2-anisidide
2'.3'-hydroxynaphthoic acid-2-chloranilide
2'.3'-hydroxynaphthoic acid-3-chloranilide
2'.3'-hydroxynaphthoic acid-4-chloranilide
2'.3'-hydroxynaphthoic acid-4-toluidide
2'.3'-hydroxynaphthoic acid-5-chloro-2-anisidide
2'.3'-hydroxynaphthoic acid-2-toluidide
2'.3'-hydroxynaphthoic acid-2-anisidide
2'.3'-hydroxynaphthoic acid condensed with aminohydroquinone-dimethyl-ether
2'.3'-hydroxynaphthoic acid-1-naphthylamide
2'.3'-hydroxynaphthoic acid-2-naphthylamide
2'.3'-hydroxynaphthoic acid-4-anisidide
2'.3'-hydroxynaphthoic acid-3-nitranilide
2'.3'-hydroxynaphthoic acid-3-nitranilide
2'.3'-hydroxynaphthoic acid-3-nitranilide
2'.3'-hydroxynaphthoic acid-3-nitranilide
2'.3'-hydroxynaphthoic acid-5-chloro-2-toluidide
2'.3'-hydroxynaphthoic acid-2-toluidide with 1-amino-2.4-dimethoxy-5-benzoylaminobenzene Red violet
with 1-amino-2.4-dimethoxy-5-benzoylaminobenzene Red violet
with 1-amino-2.4-dimethoxy-5-benzoylaminobenzene Bluish violet
with 1-amino-2.4-dimethoxy-5-benzoylaminobenzene Bluish violet
with 1-amino-2.4-dimethoxy-5-benzoylaminobenzene Bluish violet
with 1-amino-2.4-dimethoxy-5-benzoylaminobenzene Vivid violet
with 1-amino-2.4-dimethoxy-5-benzoylaminobenzene Currant
with 1-amino-2.4-dimethoxy-5-benzoylaminobenzene Violet
with 1-amino-2.4-dimethoxy-5-benzoylaminobenzene Red violet
with 1-amino-2.4-dimethoxy-5-benzoylaminobenzene vivid bluish violet
with 1-amino-2.4-dimethoxy-5-benzoylaminobenzene Vivid violet
with 1-amino-2.4-dimethoxy-5-benzoylaminobenzene Reddish violet
with 1-amino-2.4-dimethoxy-5-benzoylaminobenzene Vivid reddish violet
with 1-amino-2.4-diethoxy-5-benzoylaminobenzene Vivid violet
with 1-amino-2.4-diethoxy-5-benzoylaminobenzene Vivid bluish-violet
with 1-amino-2.4-diethoxy-5-benzoylaminobenzene Red violet
with 1-amino-2.4-diethoxy-5-benzoylaminobenzene Red violet
with 1-amino-2.4-diethoxy-5-benzoylaminobenzene Violet
with 1-amino-2.4-diethoxy-5-benzoylaminobenzene Violet
with 1-amino-2.4-diethoxy-5-benzoylaminobenzene Violet
with 1-amino-2.4-diethoxy-5-benzoylaminobenzene Vivid violet
with 1 - amino - 2.4-dimethoxy-5-(para-methoxybenzoyl)aminobenzene Vivid violet
with 1-amino-2.4-dimethoxy-5-(para-chlorbenzoyl)aminobenzene Vivid violet
with dibenzylether of 1-amino-2.4-dihydroxy-5-benzoylamino benzene Reddish-violet
with dibenzylether of 1-amino-2.4-dihydroxy-5-benzoylamino benzene Reddish-violet
with dibenzylether of 1-amino-2.4-dihydroxy-5-benzoylamino benzene Reddish-violet

We claim:

1. As new products, azo dyestuffs of the following formula:

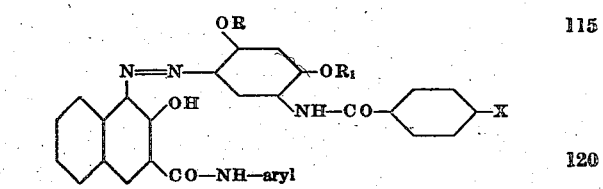

wherein R and R$_1$ stand for alkyl, aryl or aralkyl and wherein the aroyl residue and the aryl residue may be substituted or not, but may not contain any free sulfonic acid or carboxylic acid group, being reddish-violet to bluish-violet dyestuffs insoluble in water.

2. As new products, azo dyestuffs of the following formula:

wherein R and R$_1$ stand for alkyl, aryl or aralkyl and X stands for hydrogen, or any substituent with the exception of a free sulfonic acid or carboxylic acid group and wherein the aryl residue may be substituted or not, but may not contain a free sulfonic acid or carboxylic acid group, being reddish-violet to bluish-violet dyestuffs, insoluble in water.

3. As new products, azo dyestuffs of the following formula:

wherein R and R$_1$ stand for alkyl, aryl or aralkyl and X stands for hydrogen, alkyl or halogen and wherein the aryl residue may be substituted or not, but may not contain a free sulfonic acid or carboxylic acid group, being reddish-violet to bluish-violet dyestuffs, insoluble in water.

4. As new products, azo dyestuffs of the following formula:

[Chemical structure: naphthalene with OH, N=N linkage to benzene ring with OR, OR₁, NH—CO—C₆H₅ substituents, and CO—NH—aryl group]

wherein R and R₁ stand for alkyl, aryl or aralkyl and wherein the aryl residue may be substituted or not, but may not contain a free sulfonic acid or carboxylic acid group, being reddish-violet to bluish-violet dyestuffs, insoluble in water.

5. As new products, azo dyestuffs of the following formula:

[Chemical structure: naphthalene with OH, N=N linkage to benzene ring with OCH₃, OCH₃, NH—aroyl substituents, and CO—NH—aryl group]

wherein the aroyl residue and aryl residue may be substituted or not, but may contain no free sulfonic acid or carboxylic acid group, being reddish-violet to bluish-violet dyestuffs, insoluble in water.

6. As new products, azo dyestuffs of the following formula:

[Chemical structure: naphthalene with OH, N=N linkage to benzene ring with OCH₃, OCH₃, NH—CO— linked to tetra-X-substituted benzene, and CO—NH—aryl group]

wherein X stands for hydrogen or any substituent with the exception of a free sulfo- or carboxyl group and wherein the aryl residue may be substituted or not, but may not contain a free sulfonic acid or carboxylic acid group, being reddish-violet to bluish-violet dyestuffs, insoluble in water.

7. As new products, azo dyestuffs of the following formula:

[Chemical structure: naphthalene with OH, N=N linkage to benzene ring with OCH₃, OCH₃, NH—CO— linked to X-substituted benzene, and CO—NH—aryl group]

wherein X stands for hydrogen, —OCH₃ or halogen and wherein the aryl residue may be substituted or not, but may not contain a free sulfonic acid or carboxylic acid group, being reddish-violet to bluish-violet dyestuffs, insoluble in water.

8. As new products, azo dyestuffs of the following formula:

[Chemical structure: naphthalene with OH, N=N linkage to benzene ring with OCH₃, OCH₃, NH—CO—C₆H₅ substituents, and CO—NH—aryl group]

wherein the aryl residue may be substituted or not, but may not contain a free sulfonic acid or carboxylic acid group, being reddish-violet to bluish-violet dyestuffs, insoluble in water.

9. As new products, azo dyestuffs of the following formula:

[Chemical structure: naphthalene with OH, N=N linkage to benzene ring with OCH₃, OCH₃, NH—CO—C₆H₅ substituents, and CO—NH—R group]

wherein R stands for a residue of the benzene or naphthalene series, which may be substituted in any manner, but may not contain a free sulfonic acid or carboxylic acid group, being reddish-violet to bluish-violet dyestuffs, insoluble in water.

10. As a new product, the azo dyestuffs of the following formula:

[Chemical structure: naphthalene with OH, N=N linkage to benzene ring with OCH₃, OCH₃, NH—CO—C₆H₅ substituents, and CO—NH— linked to nitro-substituted benzene]

being a fast violet dyestuff, insoluble in water.

11. Material dyed with dyestuffs as claimed in claim 1.
12. Material dyed with dyestuffs as claimed in claim 2.
13. Material dyed with dyestuffs as claimed in claim 3.
14. Material dyed with dyestuffs as claimed in claim 4.
15. Material dyed with dyestuffs as claimed in claim 5.
16. Material dyed with dyestuffs as claimed in claim 6.
17. Material dyed with dyestuffs as claimed in claim 7.
18. Material dyed with dyestuffs as claimed in claim 8.
19. Material dyed with dyestuffs as claimed in claim 9.
20. Material dyed with the dyestuff as claimed in claim 10.

In testimony whereof, we affix our signatures.

HERMANN WAGNER.
ADOLF KUCHENBECKER.
RICHARD HUSS.